March 28, 1967     E. J. MOORE     3,311,679
PROCESS FOR ORIENTING TUBULAR FILMS OF POLYMERIC MATERIAL
Filed Dec. 29, 1964
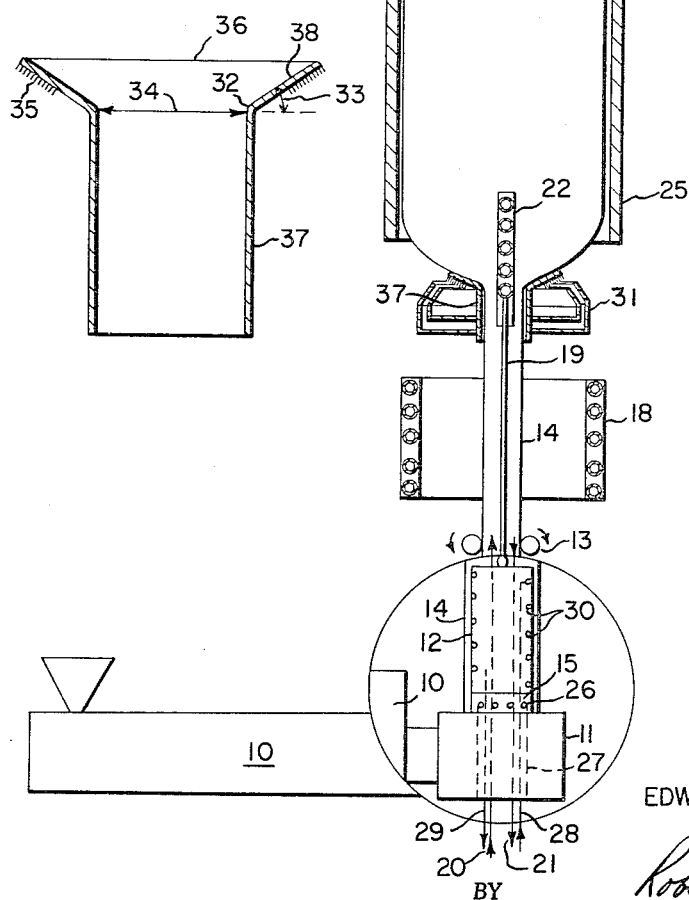
INVENTOR
EDWARD JOSEPH MOORE
BY *Robert W. Black*
ATTORNEY United States Patent Office 3,311,679
Patented Mar. 28, 1967

3,311,679
PROCESS FOR ORIENTING TUBULAR FILMS OF POLYMERIC MATERIAL
Edward Joseph Moore, Tonawanda, N.Y., assignor to E. I. du Pont de Nemours and Company, Wilmington, Del., a corporation of Delaware
Filed Dec. 29, 1964, Ser. No. 421,781
13 Claims. (Cl. 264—25)

This invention relates to the orientation of thermoplastic polymeric film in tubular form. More particularly, it relates to a method for orienting by a combination of expansion and longitudinal stretching to improve the properties of thermoplastic, polymeric, tubular film, particularly polypropylene tubular film.

The idea of orienting under controlled conditions, particularly at a controlled temperature, to improve the physical properties of thermoplastic polymeric film, is not new. The idea of expanding a thermoplastic polymeric, tubular film by providing gas under pressure with the tubular film is not new either. The phenomenon of non-uniform stretching, however, which appears in film as one of more V-like patterns in the stretching zone and corresponding tension-lanes in the wound film, is associated with most thermoplastic polymers, particularly polypropylene. This problem has prevailed for a long time and is a problem that has discouraged the use of the expansion or blowing process for the orientation of polymeric film.

An object of the present invention is a method of preventing non-uniform stretching in thermoplastic polymeric, tubular film during expansion to provide a process for orienting such film.

It is a further object of this invention to provide an initial restrainment in the expansion of thermoplastic, polymeric, tubular film to provide a process for the orientation of such film to prevent non-uniform stretching. These and other objects will appear hereinafter.

The manner in which the objects of the invention are attained is set out in the following description and the drawings, in which:

FIGURE 1 is a schematic view, partially in section, of an apparatus adapted to carry out the process of the present invention; and FIGURE 2 is a cross-sectional view of a diverging-restraining ring useful in the apparatus shown in FIGURE 1.

The objects of the invention are accomplished by the improved process wherein thermoplastic polymeric material is extruded in the form of a tubular sheet or film heated to thermoplastic condition, i.e., in a formative state above its crystalline melting point; the tubular sheet is advanced at a predetermined initial rate; the tubular sheet is quenched to a temperature below its formative state, preferably at least 20° C. below the orientation temperature range; sufficient pressure is maintained within the tubular sheet to prevent collapse and to provide, when the tubular sheet is heated to a temperature within its orientation temperature range, an expansion to a diameter at least 2 times the original diameter of the sheet; the tubular sheet is heated to a temperature within the orientation temperature range, preferably the sheet is heated to a temperature within the orientation temperature range internally from an internally centrally located radiant heat source, to expand the tubular sheet to a diameter at least 2 times, preferably 2–10 times its original diameter as extruded, said expansion being carried out while said tubular sheet is exposed to said heat source; the heated tubular sheet is advanced, while expanding, at a rate at least 2 times, preferably 2–10 times the initial rate of advancement; and the tubular sheet is cooled while the sheet is maintained substantially at its expanded diameter, the improvement comprising: initially restraining the tubular sheet at and beyond the plane of initial expansion, preferably until at least 40% of the initially transverse direction elongation has occurred, and then permitting further expansion without restraint.

By the present invention, the maxima points in a normal stress-strain relationship are avoided through the use of the diverging-restraining ring placed in the tubular film line at and just beyond the "natural" blow point or plane of initial expansion of the tubular film as it expands upon reheating at the given internal pressure.

It is apparent from the typical stress-strain curves for various materials, particularly for polyolefins, that if the stretching, elongation, takes place under essentially uniform stress at a sufficiently high temperature to avoid a stress-straining relationship having a maximum, the stretching will occur over the most desirable portion of the curve. The diverging-restraining ring prevents initiation of stretching before the desired temperature is reached, equalizes the tension around the circumference of the expanding tubular film and maintains these conditions until the region of the maxima in the stress-strain relationships at the lower temperatures has been passed.

Similarly, the curves indicate and practice has verified that if the transverse circumferential expansion is restrained until at least 40% elongation has occurred, further elongation without non-uniform stretching can be done without restraint.

The diverging-restraining ring, optionally internally cooled by appropriate means, normalizes the temperature around the circumference of the tubular film and restrains the transverse direction expansion. When the film is restrained above its minimum stretching temperature, the cooling required is accomplished by the diverging-restraining ring to substantially improve stretching uniformity when the film is subsequently stretched without restraint. The process temperature profile confirms that cooling during stretching is required for satisfactory operation. The diverging-restraining ring provides a sufficiently high cooling rate, and can be internally cooled for higher cooling rates, to the outside surface of the tubular film to retard the thin portions of the film from stretching excessively and, therefore, retards gauge magnification.

The "orientation temperature range," as defined herein, refers to the temperature range in which molecular orientation of a polymeric film may be effected. This range lies somewhere below the melting temperature of a polymer that melts at a specific temperature or below the crystalline melting point of a crystalline polymer that melts over a range of temperatures. The crystalline melting point refers to the temperature at which the crystallites of a crystalline polymer are no longer detectable under X-ray examination when the solid polymer is heated until it melts.

For some crystalline polymers such as polyethylene, polypropylene, and other polyhydrocarbons, the orientation temperature range may be the range of temperature over which the crystallites melt but below the temperature at which the crystallites are no longer detectable. In the case of polyesters such as polyethylene terephthalate and the like, the so-called "crystallizable" polymers, the orientation temperature range extends from about 10° C. to 40° C. above the second order transition temperature of the polymer. The second order transition temperature is that temperature at which an essentially amorphous polymer or one that can be quenched as an amorphous polymer but is crystallizable makes a transition from a glassy state to a rubbery state. It is in this rubbery state that the polymer in the form of a film or a filament can be oriented by stretching. The second order transition temperature varies with the molecular weight of the polymer and is defined more completely in U.S. Patent 2,578,899.

The specific orientation temperature range will vary from polymer to polymer but may be determined by experimentation or from the literature. In the following table, Table I, the orientation temperature range, the second order transition temperature and the crystalline melting point are given for some representative amorphous polymers and some "crystallizable" polymers that are amorphous as quenched.

TABLE I

| Polymer | Second Order Transition Temp. (° C.) | Crystalline Melting Point (° C.) | Orientation Temperature Range (° C.) |
|---|---|---|---|
| Polyethylene terephthalate | 70 | 255 | 85–110 |
| Polyethylene-2,6-naphthalate | 113 | 265 | 120–140 |
| Polytetramethylene-1,2-dioxybenzoate | 53 | 220 | 70–90 |
| Polyethylene-1,5-naphthalate | 71 | 225 | 80–100 |
| Polyhexamethylene adipamide | 45–50 | 250 | 65–75 |
| Polyhexamethylene sebacamide | 45–50 | 250 | 65–75 |
| Polycaprolactam | 45–50 | 250 | 65–75 |
| 70% ethylene terephthalate/ 30% ethylene isophthalate copolymer | 51 | 170 | 70–90 |
| Polyvinyl chloride: | | | |
| No plasticizer | 105 | 170 | 115–145 |
| 5% plasticizer | 90 | 170 | 100–130 |
| 10% plasticizer | 75 | 170 | 85–115 |
| 15% plasticizer | 60 | 170 | 70–100 |
| 84% tetrafluoroethylene/ 16% hexafluoropropylene copolymer | 85 | 275 | 95–125 |
| Polystyrene | None | [1] 88–120 | 88–110 |
| Polymethylmethacrylate | None | [1] 66–111 | 66–105 |

[1] Softening range rather than crystalline melting point since the polymer is obtainable as an amorphous polymer.

In the following table, Table II, the orientation temperature range, the density, and the crystalline melting point are listed for some representative crystalline polymers.

TABLE II

| Polymer | Density at 20° C. (gm./cc.) | Crystalline Melting Point (° C.) | Orientation Temperature Range (°C.) |
|---|---|---|---|
| Polypropylene | 0.8825 | 140 | 100–120 |
| | 0.8912 | 150 | 120–140 |
| | 0.9014 | 165 | 125–145 |
| | 0.9092 | 173 | 135–160 |
| | 0.9123 | 179 | 140–160 |
| Polyethylene | 0.90 | 98 | 50–80 |
| | 0.92 | 112.5 | 80–110 |
| | 0.95 | 134 | 120–130 |
| Polyvinyl fluoride | 1.38 | 193–198 | 175–185 |
| Polyvinylidene fluoride | 1.76 | 174 | 150–165 |
| Polyoxymethylene | 1.3–1.5 | 180–185 | 120–180 |

In the following table, Table III, the preferred conditions of this process for several particularly important polymers are listed.

TABLE III

| Polymer | Quench Temp. Range (° C.) | Temp. in Initial Heating Zone (° C.) | Temp. in Final Heating Zone (° C.) | Elongation Range (times original dimensions) |
|---|---|---|---|---|
| Polypropylene [1] | 0–40 | 130–145 | 150–159 | 2–10 |
| Polyethylene terephthalate | 20–50 | 60–80 | 85–110 | 2–6 |
| Polyethylene [2] | 0–40 | 80–120 | 100–130 | 2–10 |
| Polyvinyl chloride [3] | 20–40 | 65–80 | 85–115 | 2–6 |

[1] Density above 0.909 gms./cc.
[2] Density above 0.92 gms./cc.
[3] Plasticizer content of 0–15%.

Referring to FIGURE 1, which is a diagrammatic illustration of the process of this invention, the thermoplastic polymer is first heated to a temperature above its melting point in the extruder 10. The molten polymer, preferably at a temperature at least 10° C. above its melting point or crystalline melting point, is extruded through die 11 in the form of a tubular film 14, the tube having a wall thickness of anywhere from 15 to 85 mils. The tubular film is then drawn over a cooling mandrel 12 by means of the tube advancer 13. The tube advancer 13 is composed of two sets of driven rubber squeeze rolls which contact the surface of the cooled tubular film to advance the film at a predetermined initial rate. The tube advancer 13 also serves to prevent sway of the film and to insulate the freshly extruded film adjacent the die from the subsequently applied longitudinal tension. Instead of driven rolls, endless belts may be used as the tube advancer.

The cooling or quench mandrel 12 is a hollow metal cylinder insulated from the die by a non-metallic insulating disc 15. The disc has openings 26 around its periphery, the openings communicating with the atmosphere through conduit 27. Coils 30 communicating with inlet and outlet tubes 28 and 29 in the conduit, are disposed adjacent to the interior surface of the mandrel. The coils 30 convey cooling water which serves to reduce the temperature of the tubular film to about room temperature, although any temperature from −10° C. to about 50° C. would be adequate to convert most thermoplastic polymeric films to a non-formative plastic state, i.e., a state where the film resists stretching. Since cooling tends to shrink the thermoplastic polymeric tubular film, the mandrel is preferably tapered to the contour of the shrinking film. If necessary, pressure relief areas such as those disclosed in U.S. Patent 3,987,765 may be provided to isolate the gas pressure downstream of the mandrel 12.

Drawing is accomplished by means of a set of nip rolls 24 rotating at a rate that is at least 2 times the rate of the tube advancer 13. Next, the film is advanced through the initial heating section 18. It should be understood that any other means that would serve to heat the outside surface of the tubular film would operate in this invention. The initial heating section 18 serves to heat the film to a temperature range to just below the orientation temperature range of the thermoplastic polymer. The precise temperature to which the film is heated in the initial heating section 18 will depend upon several factors. For example, the greater the throughput of the film, the higher the temperature to which the film must be heated. The greater the intensity of the final internal heater 22, the lower the temperature to which the film need be heated in the initial heating section 18 at constant throughput. In the present invention, temperature uniformity of the tubular film just prior to expansion and during the initial expansion can be improved through the use of diverging-restraining ring 36.

Air or other gaseous medium admitted through inlet 20 and vented through outlet 21 provides the pressure within the tubular film to prevent collapse of the film while the film is at a temperature below the orientation temperature range and to expand the tubular film a predetermined amount when the temperature of the film reaches the orientation temperature range. The amount of expansion is dependent upon the pressure within the film, the precise temperature within the orientation temperature range to which the film is brought, the rate of heating the film, the thickness of the film wall, the rate of cooling, etc., and can either be pre-set by one skilled in the art or set after experimentation.

The tubular film is brought to a temperature within the orientation temperature range at which the film expands by means of the pencil-type, internal radiant heater 22 mounted on the shaft 19. Heater 22 is connected to a power source by wires leading through the conduit 27 to a power source, not shown. The tubular film 14, immediately upon reaching the orientation temperature range, starts to expand due to the pressure within it and to elongate due to the relative rates of the nip rolls 24 and the tube advancer 13. However, just prior to expansion, the outside surface of the film bears against cylindrical section 37 of restraining ring 36 and as the tubular film starts to expand, the outside surface of the film bears against the diverging flange portion 30 of restraining ring 36 such that the temperature and the resultant tensions around the circumference of the tubular film tend to be equalized and the expansion and orientation are under controlled restraint. The tubular film, as it expands and is drawn through and past the diverging-restraining ring, expands further unrestrained and its inner surface gets farther away from internal heater 22. After leaving restraining ring 36 the external surface is cooled by forced air from circumferential cooling ring 31. The outlet of cooling ring 31 is directed so that part of the cooling air impinges on the outside surface of tubular film 14 and part on the cooling fins 35 located on the outer surface of flange 38. The outside surface of tubular film 14 then approaches cooling ring 25. This combination of the film moving farther from the internal heater in the diverging-restraining ring, the forced cool air and the approach to the cooling ring serves to reduce the temperature of the film. The resulting expanded and stretched tubular film is then further cooled by continuing its passage through the cooling ring 25. Cooling ring 25 can contain coils to convey cooling water in its surface as in the quenching mandrel. It should be understood that neither the precise heating means nor the precise cooling means described or shown in the figure are to be construed as limitative in the present invention.

Referring to FIGURE 2, the preferred relationship of restraining ring 36 for controlling circumferential tubular restraint, the length and taper of cylindrical section 37, length of cone or flange portion 38 (with corresponding transition radius 32), angle of cone 33 and effective diameter 34 (diametral clearance) are determined by the stretching characteristics, operating temperature, and pressure of a given system. The heating transfer from the tubular film to the restraining ring and the balancing of bubble pressure and the protective boundary air film on the outside of the tubular film generally governs the performance of a restraining ring.

With respect to the design parameters of the diverging-restraining ring, it should be noted that with respect to the diametral clearance between the reheated cast film and the diverging-restraining ring, both high and low diametral clearances proved equally effective in eliminating non-uniform stretching. A wider operating range can be maintained with a high diametral clearance but requires higher orientation temperatures. For a cast tube diameter of 9.6 inches, a 30–40 mil diametral clearance between the tube and cylindrical section 37 of the diverging-restraining ring 36 results in stable operation while a clearance of 130–140 mil results in unsatisfactory operation. An interference (the tube diameter is greater than the diameter of the cylindrical section of the diverging-restraining ring) of 40–50 mil was inoperable. A low drag force per unit of circumference between the outside surface of the film and cylindrical section 37 should be maintained.

With respect to the cone length of flange 38, both long and short cone lengths are equally effective in eliminating non-uniform stretching but the longer cone markedly improves stability and sheet flatness. A long cylinder length tends to improve temperature uniformity with resulting better gauge; however, drag forces tend to increase with an increase in length at low diametral clearances.

With respect to the angle of the cone, the cone angle 33 should conform as near as possible to the desired bubble shape with angles of from 5° to 45° from the horizontal having worked effectively. However, with a decreased angle or increased cone length, the drag forces over the surface became greater. It has been found that small radii are effective and desirable, e.g., ¼–½ inch, for the transition radius 32 between the cone and cylinder.

A preferred diverging-restraining ring for a cast tube diameter of 9.6–9.7 inches has a cylindrical length of 15 inches, a transition radius of ⅝ inch, a cone length of 6 inches, and the cone angle is 35° from the horizontal. Any other corresponding ratios of lengths can be used for the appropriate diameter.

The material of construction of diverging-restraining ring 36 and its surface finish usually are chosen with respect to the specific polymer involved, the polymer's coefficient of friction, the drag forces during restraint and the temperature relationship desired for effective uniform stretching and minimum gauge variation. Suitable materials include aluminum, beryllium copper, steel, chromium plated aluminum and steel and fluoroethylene polymer ("Teflon") coated aluminum and steel.

The concentricity of the restraining ring with the rest of the process apparatus is important. The diverging-restraining ring should be concentric with the quench mandrel, external heater, the internal radiant heater, air ring and cooling ring, and thus the tubular film; and serves to guide the tube and to assure accurate seating of the bubble on the flange for the proper temperature and tension normalization of the expanding tubular film. It should be understood that the diverging-restraining ring can be stationary or, as is preferred, can be rotated or counter-rotated or oscillated at a controlled frequency with the rest of the unit.

By adhering to the limits of the process of the present invention, several outstanding results are at once apparent. The resulting biaxially oriented film does not display the usual magnified gauge variations normally accompanying film-flowing processes. That is, gauge variations, almost unavoidable during extrusion, are not magnified as in prior art blowing processes by the expansion process of the present invention. Another outstanding result is that crystalline polymers, particularly polypropylene, which heretofore had suffered from non-uniform stretching when stretched by expanding the tubular film, do not suffer from this fatal shortcoming when subjected to the process of the present invention. Films prepared by the present invention have improved sheet flatness. Also within the limits of the process films having a low longitudinal direction and a high transverse direction shrinkage can be produced.

The following examples serve to illustrate the present invention, Example 1 being the best mode contemplated for practicing the invention.

*Example 1*

Molten polypropylene having a density of 0.90 is extruded at a temperature of 200–210° C. and at a rate of 160 pounds per hour from a 4.5 inch extruder through 9.6 inch circular die having a 35 mil lip opening. The apparatus was that shown in FIGURE 1. The extruded tubular film is quenched to the non-formative plastic state by being passed over a nominal 9.6 inch diameter tapered internal mandrel maintained at a temperature of about 15° C., the taper of the mandrel being 6.5 mils per inch. The tubular film is withdrawn from the die over the internal mandrel by a tube advancer operating at 9.5 feet per minute. Air is injected and vented to the atmosphere through connections in the end of the quench mandrel. The resulting open bubble system provides a pressure of 5 inches of water within the tubular film. As the tubular film cools over the internal mandrel, it shrinks in diameter. This shrinkage, together with the taper of the mandrel, serves to prevent the air injected at the end of the mandrel from exerting pressure on the molten tubular film in the area adjacent the die.

After passing through the tube advancer, the tubular film is passed into an initial heating zone where it is heated to a temperature of 135° C. The initial heating zone is formed by external radiant heaters maintained at 370–425° C. The diverging-restraining ring has a cylindrical section 15 inches long and 9.72 inches in diameter, the conical section of the diverging-restraining ring is 6 inches long, with a ¼ inch radius of transition between the sections. After passing through the initial heating section, the tubular film passes into the cylindrical section of the restraining ring.

Immediately after passing through the initial heating zone, the tubular film is also passed into the final heating zone where it is heated to a temperature of about 150–155° C. Heating is provided by a pencil-type internal radiant heater 36 inches long, rated at 14.2 kilowatts, operated at 12 kilowatts capacity and having a surface temperature of about 600° C. At the internal pressure of 5 inches of water and at the temperature of 150–155° C., the tubular film stretches and expands. The conical section of the diverging-restraining ring also is air cooled by part of the air ring air. The temperature of this ring section is 135° C. The expanding tubular film seats against the conical section and is thus restrained during the initial circumferential expansion. The tubular film is restrained until approximately 40% (1.4×) expansion has occurred. The diverging-restraining ring equalizes the temperature and tensions of tubular film during the expansion. Stretching of 5 times its original length is accomplished by a set of nip rolls that draw the film at a rate of 47.5 feet per minute. Expansion to a diameter of 48 inches gives a transverse stretch of 5 times the original diameter.

The major amount of cooling is accomplished by forcing the cooling ring air at a temperature of 40° C. and at a rate of about 600 feet per minute against the outside surface of the tubular film. The expanded film is further cooled by a water-cooled ring 36 inches long and 48 inches in diameter which serves to cool the expanded and stretched film to a temperature of about 35° C. The tubular film which has been elongated 5 times in both the transverse and longitudinal directions is finally collapsed as it passes through the nip of a set of nip rolls and is finally wound on a roll.

The film having a nominal thickness of 1.0 mil displays the following properties:

|  | Longitudinal Direction LD | Transverse Direction TD |
| --- | --- | --- |
| Tensile Strength (lbs./sq. in.) | 22,000 | 20,000 |
| Elongation (percent) | 61 | 67 |
| Initial Tensile Modulus (lbs./sq. in.) | 293,100 | 239,300 |
| Gauge Variation (percent) | 20 | 20 |
| Shrinkage (percent) 1 min. at 130° C. | 6.9 | 32.2 |

The finally wound film exhibits a high degree of film gauge uniformity whereas a similarly prepared film, without the restraining ring exhibits a high degree of film gauge non-uniformity as a result of non-uniform stretching, which can usually be visually detected in the form of uneven, narrow tension lanes in the film in the machine direction.

Tensile Strength, Elongation, and Initial Tensile Modulus are normally measured at 23.5° C. and 50% relative humidity, although they may also be measured at other specified temperatures and humidities. They are determined by elongating the film sample in an Instron tensile tester at a rate of 100% per minute until the sample breaks. The force applied at the break in p.s.i. is the tensile strength. The elongation is the percent increase in the length of the sample at breakage. Initial tensile modulus in p.s.i. is directly related to the film stiffness. It is obtained from the slope of the stress-strain curve at an elongation of 1%. Both tensile strength and initial tensile modulus are based upon the initial cross-sectional area of the sample.

Shrinkage is a measure of the form-stability of the film. Ten sample strips, 2.5′ x 5″ each, from each direction, i.e., ten having the longer dimension running in the machine or longitudinal direction or the direction in which the film was extruded and ten having the longer dimension running in a direction transverse to the machine direction, are supported from two adjacent corners and suspended in a heated liquid at the desired temperature for 1 minute. The dimensional change is then noted, and percent shrinkage is calculated based on the original dimension.

Gauge variation is a measure of film thickness non-uniformity. It is generally measured by an electric micrograph at close intervals across the film's transverse direction. The percentage of gauge variation is expressed by the difference between the maximum and minimum thicknesses divided by the average thickness (unit weight basis) of the film.

*Example 2*

A molten polyethylene blend (75% Alathon 1412—density 0.915/25% Alathon 7020—density 0.958) having a density of 0.925 is extruded at a temperature of 200° C. and at a rate of 60 pounds per hour from 2½ inch extruder through a 4.75 inch circular die having a 60 mil lip opening. The apparatus was that shown in FIGURE 1. The extruded tubular film is quenched to the non-formative plastic state by being passed over a nominal 4.87 inch diameter tapered internal mandrel maintained at a temperature of about 31° C., the taper of the mandrel being 7 mils per inch. The tubular film is withdrawn from the die over the internal mandrel by a tube advancer operating at 6.3 feet per minute. Air is injected and vented to the atmosphere through connections in the end of the quench mandrel. The resulting open bubble system provides a pressure of 2 inches of water within the tubular film. As the tubular film cools over the internal mandrel, it shrinks in diameter. This shrinkage, together with the taper of the mandrel, serves to prevent the air injected at the end of the mandrel from exerting pressure on the molten tubular film in the area adjacent the die.

After passing through the tube advancer, the tubular film is passed into an initial heating zone where it is heated to a temperature of 105° C. The initial heating zone is formed by external radiant heaters maintained at 436° C. The diverging-restraining ring has a cylindrical section 3 inches long and 4.87 inches in diameter, the conical section of the diverging-restraining ring is 1 inch long, with a ¼ inch radius of transition between the sections. After passing through the initial heating section, the tubular film passes into the cylindrical section of the restraining ring.

Immediately after passing through the initial heating zone, the tubular film is also passed into the final heating zone where it is heated to a temperature of about 114° C. Heating is provided by a pencil-type internal radiant heater 18 inches long, 2½″ diameter rated at 3.75 kilowatts, operated at 2.5 kilowatts capacity and having a surface temperature of 705° C. At the internal pressure of 2 inches of water and at the temperature of 114° C., the tubular film stretches and expands. The conical section of the diverging-restraining ring also is air cooled by part of the air ring air. The temperature of the restraining ring is 87° C. The expanding tubular film seats against the conical section and is thus restrained during the initial circumferential expansion. The tubular film is restrained for approximately 40% of the expansion. The diverging-restraining ring equalizes the temperature and tensions of tubular film during the expansion. Stretching of 5.2 times its original length is accomplished by a set of nip rolls that drew the film at a rate of 33 feet per minute. Expansion to a diameter of 25 inches gives a transverse stretch of 5.2 times the original diameter.

The major amount of cooling is accomplished by forcing the cooling ring air at a temperature of 40° C. and at a rate of about 850 feet per minute against the outside surface of the tubular film. The expanded film is further cooled by a water-cooled ring 24 inches long and 25 inches in diameter which serves to cool the expanded and stretched film to a temperature of about 35° C. The tubular film which has been elongated 5.2 times in both the transverse and longitudinal directions is finally collapsed as it passes through the nip of a set of nip rolls and is finally wound on a roll.

The film having a nominal thickness of 1.2 mil displays the following properties:

|  | Longitudinal Direction LD | Transverse Direction TD |
| --- | --- | --- |
| Tensile Strength (lbs./sq. in.) | 7,600 | 7,800 |
| Elongation (percent) | 111 | 113 |
| Initial Tensile Modulus (lbs./sq. in.) | 61,000 | 58,000 |
| Gauge Variation (percent) | 27 | 27 |
| Shrinkage (percent) 1 min. at 100° C. | 21 | 33 |

As the above table indicates, the finally wound film exhibits uniform gauge whereas a similarly prepared film, without the restraining ring exhibits non-uniform gauge as indicated by a gauge variation of 49%.

What is claimed is:

1. In a process wherein thermoplastic polymeric material is extruded in the form of a tubular sheet in its formative state; the tubular sheet is advanced at a predetermined initial rate; the tubular sheet is then quenched to a temperature below its formative state; sufficient pressure is maintained within the tubular sheet to prevent collapse and to provide, when the tubular sheet is heated to a temperature within its orientation temperature range, an expansion to a diameter at least 2 times the original diameter of the sheet; the tubular sheet is heated to a temperature within the orientation temperature range to expand the tubular sheet to a diameter at least 2 times its original diameter, said expansion being carried out while said tubular sheet is exposed to said heat source; the heated tubular sheet is advanced, while expanding, at a rate at least 2 times the initial rate of advancement; and the tubular sheet is cooled while the sheet is maintained substantially at its expanded diameter; the improvement comprising: initially restraining the tubular sheet at and beyond the plane of initial expansion and then permitting further expansion without restraint.

2. The process of claim 1 wherein the tubular sheet is initially restrained until at least 40% of the expansion has occurred.

3. The process of claim 2 wherein the thermoplastic polymeric material is polypropylene.

4. In a process wherein thermoplastic polymeric material is extruded in the form of a tubular sheet in its formative state; the tubular sheet is advanced at a predetermined initial rate; the tubular sheet is then quenched to a temperature below its formative state; sufficient pressure is maintained within the tubular sheet to prevent collapse and to provide, when the tubular sheet is heated to a temperature within its orientation temperature range, an expansion to a diameter at least 2 times the original diameter of the sheet; the tubular sheet is heated from a radiant heat source to a temperature within the orientation temperature range of the polymeric material to expand the tubular sheet to a diameter at least 2 times its original diameter; the heated tubular sheet is advanced, while expanding, at a rate at least 2 times the initial rate of advancement; and the tubular sheet is cooled while the sheet is maintained substantially at its expanded diameter; the improvement comprising: restraining the tubular sheet at and beyond the plane of initial expansion until the stress is essentially uniform and then permitting further expansion without restraint.

5. The process of claim 4 wherein the tubular sheet is restrained until the maximum point of the stress-strain curve of said tubular sheet if unrestrained is exceeded.

6. The process of claim 5 wherein the thermoplastic polymeric material is polypropylene.

7. In a process wherein thermoplastic polymeric material is extruded in the form of a tubular sheet in its formative state; the tubular sheet is advanced at a predetermined initial rate; the tubular sheet is then quenched to a temperature below its formative state; sufficient pressure is maintained within the tubular sheet to prevent collapse and to provide, when the tubular sheet is heated to a temperature within its orientation temperature range, an expansion to a diameter at least 2 times the original diameter of the sheet; the tubular sheet is heated internally from an internally disposed radiant heat source to a temperature within the orientation temperature range to expand the tubular sheet to a diameter at least 2 times its original diameter, said expansion being carried out while said tubular sheet is exposed to said heat source; the heated tubular sheet is advanced, while expanding, at a rate at least 2 times the initial rate of advancement; and the tubular sheet is cooled while the sheet is maintained substantially at its expanded diameter; the improvement comprising: restraining the tubular sheet at and beyond the plane of initial expansion by a diverging-restraining ring until the maximum point of the stress-strain curve of said tubular sheet, if unrestrained, is exceeded; maintaining said restraining ring concentric with said tubular sheet and said internal radiant heater; and permitting further expansion without restraint.

8. The process of claim 7 wherein the restraining ring is rotated.

9. The process of claim 8 wherein the tubular sheet is cooled during the expansion and restraining.

10. The process of claim 7 wherein the restraining ring is internally cooled from the plane of initial expansion.

11. In a process wherein thermoplastic polymeric material is extruded in the form of a tubular sheet in its formative state; the tubular sheet is advanced at a predetermined initial rate; the tubular sheet is then quenched to a temperature below its formative state; sufficient pressure is maintained within the tubular sheet to prevent collapse and to provide, when the tubular sheet is heated to a temperature within its orientation temperature range, an expansion to a diameter at least 2 times the original diameter of the sheet; the tubular sheet is heated internally from an internally disposed radiant heat source to a temperature within the orientation temperature range to expand the tubular sheet to a diameter at least 2 times its original diameter, said expansion being carried out while said tubular sheet is exposed to said heat source; the heated tubular sheet is advanced, while expanding, at a rate of at least 2 times the initial rate of advancement; and the tubular sheet is cooled while the sheet is maintained substantially at its expanded diameter; the improvement comprising: restraining the tubular sheet at and beyond the plane of initial expansion until at least 40% of the expansion has occurred by a diverging-restraining ring; maintaining, during restraining, the temperature and tensions around the circumference of the expanding tubular sheet substantially equal; maintaining said restraining ring concentric with said tubular sheet and said internal radiant heater; cooling the external surface of the expanding, restrained tubular sheet by internally cooling the restraining ring from the plane of initial expansion; permitting further expansion without restraint; and cooling the external surface of the unrestrained, expanding tubular sheet with forced, cool air.

12. The process of claim 7 wherein the thermoplastic material is polypropylene.

13. The process of claim 11 wherein the thermoplastic material is polypropylene.

References Cited by the Examiner

UNITED STATES PATENTS

| 3,091,807 | 6/1963 | Turner et al. | 264—95 |
| 3,231,642 | 1/1966 | Goldman et al. | 264—95 XR |
| 3,235,632 | 2/1966 | Lemmer et al. | 264—95 X |

ROBERT F. WHITE, *Primary Examiner.*

A. R. NOE, *Assistant Examiner.*